(12) United States Patent
Takata (10) Patent No.: US 9,145,088 B2
(45) Date of Patent: Sep. 29, 2015

(54) VEHICULAR OUTSIDE MIRROR DEVICE

(71) Applicant: ICHIKOH INDUSTRIES, LTD., Isehara-shi, Kanagawa-ken (JP)

(72) Inventor: Takeshi Takata, Isehara (JP)

(73) Assignee: ICHIKOH INDUSTRIES, LTD., Isehara-Shi, Kanagawa-Ken (JP)

( * ) Notice: Subject to any disclaimer, the term of this patent is extended or adjusted under 35 U.S.C. 154(b) by 0 days.

(21) Appl. No.: 14/339,668

(22) Filed: Jul. 24, 2014

(65) Prior Publication Data
US 2015/0028615 A1      Jan. 29, 2015

(30) Foreign Application Priority Data

Jul. 26, 2013   (JP) ................................. 2013-155955

(51) Int. Cl.
*B62D 39/00*      (2006.01)
*B60R 1/06*       (2006.01)

(52) U.S. Cl.
CPC ........................................ *B60R 1/06* (2013.01)

(58) Field of Classification Search
CPC ...................................................... B60R 1/06
See application file for complete search history.

(56) References Cited

U.S. PATENT DOCUMENTS

| | | | | |
|---|---|---|---|---|
| 6,310,738 | B1* | 10/2001 | Chu | 359/883 |
| 7,758,010 | B2* | 7/2010 | Tanaka | 248/475.1 |
| 8,506,098 | B2* | 8/2013 | Murata | 359/871 |
| 2003/0011909 | A1* | 1/2003 | Tun-Jen | 359/883 |
| 2004/0104539 | A1* | 6/2004 | Nakazawa | 277/637 |

FOREIGN PATENT DOCUMENTS

JP      2005-319908 A      11/2005

* cited by examiner

*Primary Examiner* — Lori L Lyjak
(74) *Attorney, Agent, or Firm* — Foley & Lardner LLP

(57) ABSTRACT

A vehicular outside mirror device according to the present invention is provided with a base assembly and a mirror assembly. The base assembly is made of a base, a gasket, and a cover. In the base and the cover, an engagement portion and an elastic engagement claw portion are respectively provided. In the base and the gasket, an engagement pin and an engagement hole are respectively provided. In the gasket, a pressing portion is provided. As a result, the present invention is capable of integrally assembling the base, the gasket, and the cover with each other without a need to use a screw. In this manner, its related manufacturing costs can be reduced.

4 Claims, 8 Drawing Sheets

VEHICULAR OUTSIDE MIRROR DEVICE

CROSS REFERENCE TO RELATED APPLICATIONS

This application claims priority of Japanese Patent Application No. 2013-155955 filed on Jul. 26, 2013. The contents of this application are incorporated herein by reference in their entirety.

BACKGROUND OF THE INVENTION

1. Field of the Invention

The present invention relates to a vehicular outside mirror device such as a door mirror.

2. Description of the Related Art

A vehicular outside mirror device of such a type is conventionally known (for example, reference should be made to Japanese Unexamined Patent Application Publication No. 2005-319908). Hereinafter, a conventional vehicular outside mirror device will be described. The conventional vehicular outside mirror device is provided with a mirror base and a base cover, and is configured to fix the mirror base and the base cover to each other by way of engagement between an engagement plate portion and an engagement claw portion and screw tightening.

However, the conventional vehicular outside mirror device requires a screw and thus the number of parts or the number of assembling steps are large, and accordingly there has been a problem associated with its related manufacturing costs.

SUMMARY OF THE INVENTION

It is an object of the present invention to reduce the number of parts or the number of assembling steps of a vehicular outside mirror device.

A vehicular outside mirror device according to first aspect of the present invention comprising: a base assembly which is fixed to a vehicle body; and a mirror assembly which is equipped in the base assembly; wherein the base assembly is comprised of: a base in which the mirror assembly is equipped; a gasket which is interposed between the base and the vehicle body; and a cover configured to cover the base and the gasket therewith; an engagement pin and an elastic engagement claw portion configured to elastically engage therewith are provided in the base and the cover, wherein an engagement pin and an engagement hole with which the engagement pin engages are provided in the base and the gasket, and a pressing portion configured to press the elastic engagement claw portion against the engagement portion is provided in the gasket.

The vehicular outside mirror device according to second aspect of the present invention, in the first aspect, wherein an insertion hole is provided in the base, the engagement portion is provided at a part of an edge part of the insertion hole, and a pinch portion configured to pinch the pressing portion together with the elastic engagement portion is provided at an edge part which is opposite to the engagement portion in the edge part of the insertion hole.

The vehicular outside mirror device according to third aspect of the present invention, in the first aspect, wherein the engagement portion and the pinch portion and the elastic engagement claw portion and the pressing portion; and the engagement pin and the engagement hole, are provided in proximity to each other.

According to the vehicular outside mirror device of the first to third aspects of the present invention, a base and a cover are assembled with each other by elastically engaging an elastic engagement claw portion with an engagement portion; the base and a gasket are also assembled with each other by engaging an engagement pin with an engagement hole; and further, the elastic engagement claw portion is pressed against the engagement portion at a pressing portion of the gasket, whereby the base, the gasket, and the cover can be integrally assembled with each other without a need to use a screw. In this manner, the number of parts or the number of assembling steps can be reduced, and accordingly its related manufacturing costs can be reduced.

DESCRIPTION OF THE PREFERRED EMBODIMENTS

Hereinafter, an embodiment of a vehicular outside mirror device according to the present invention will be described in detail with reference to the accompanying drawings. It is to be noted that the present invention is not limited by the embodiment.

Configuration of the Embodiment

Figure 1:
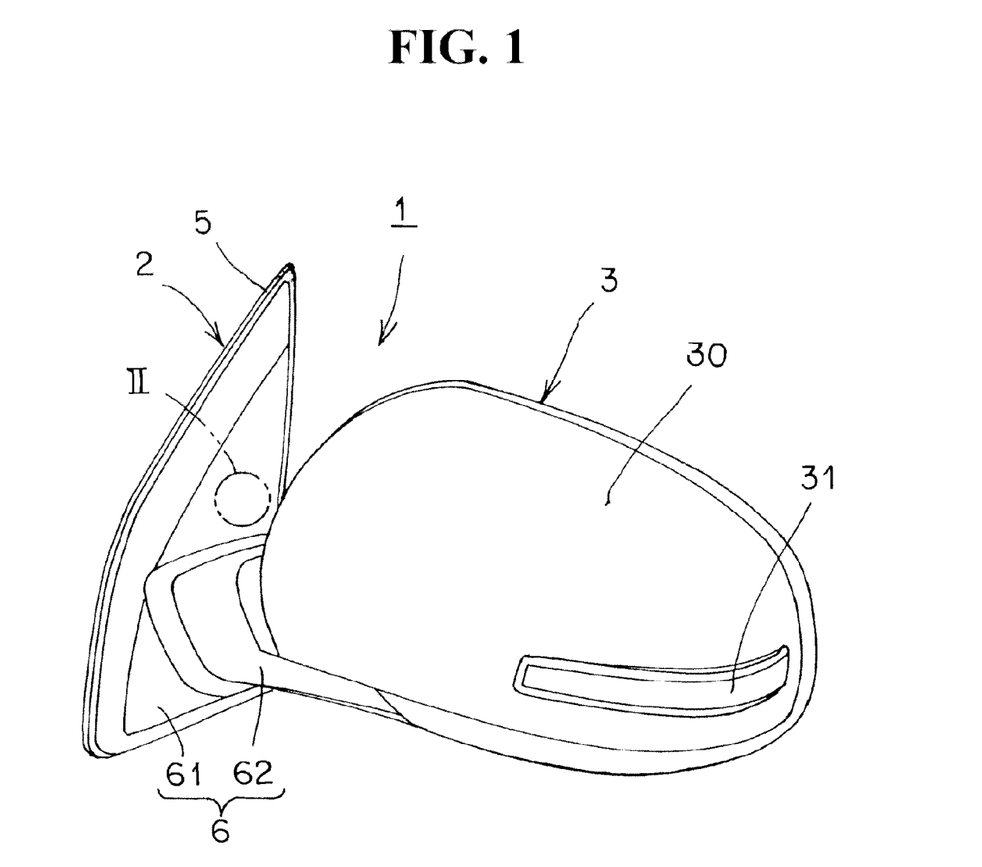
FIG. 1 is a perspective view showing an embodiment of a vehicular outside mirror device according to the present invention.
Figure 2:
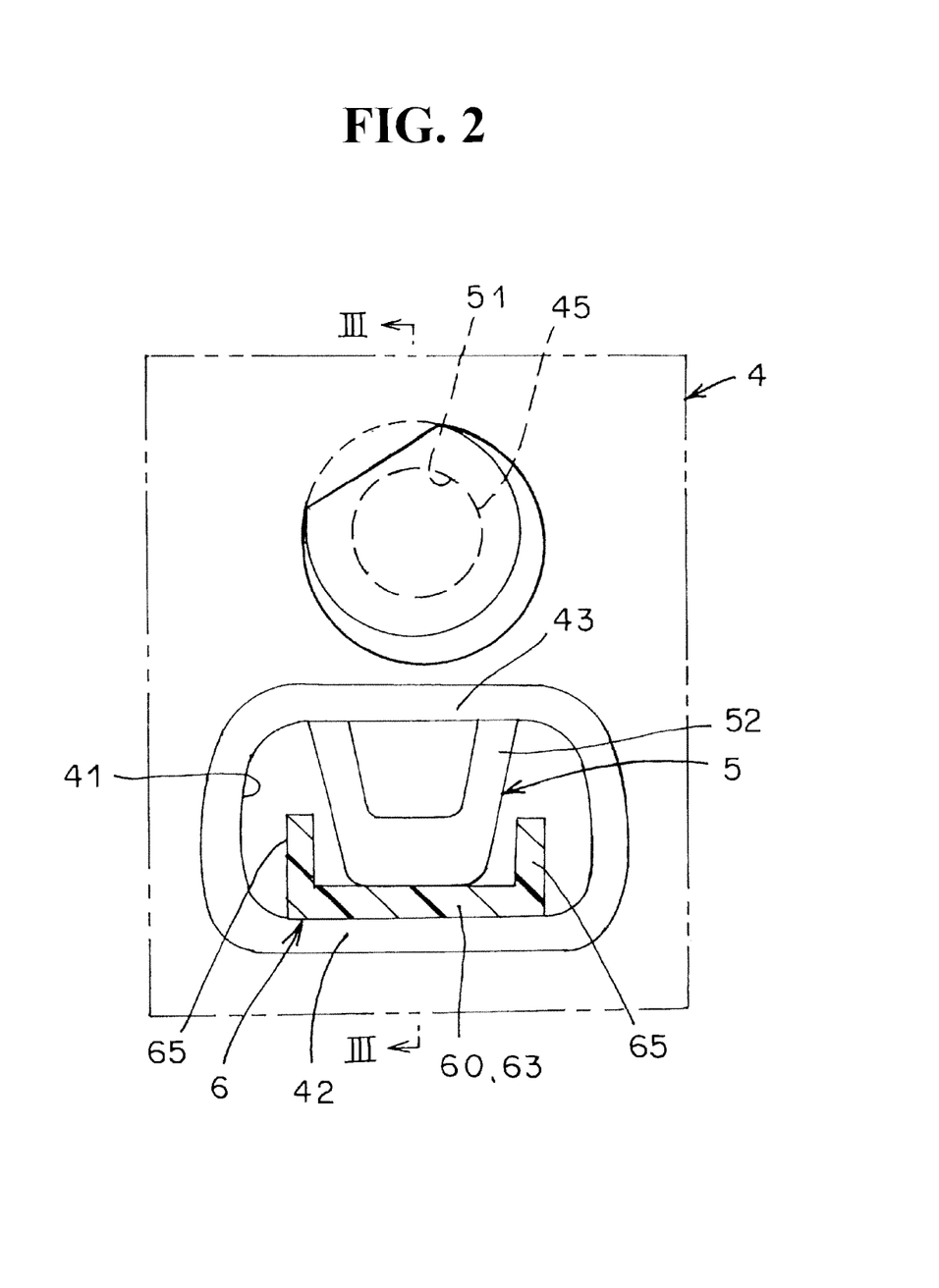
FIG. 2 is a partially enlarged view of a portion of II in FIG. 1, showing a base assembly in a state in which a part of a cover is not shown.
Figure 3:
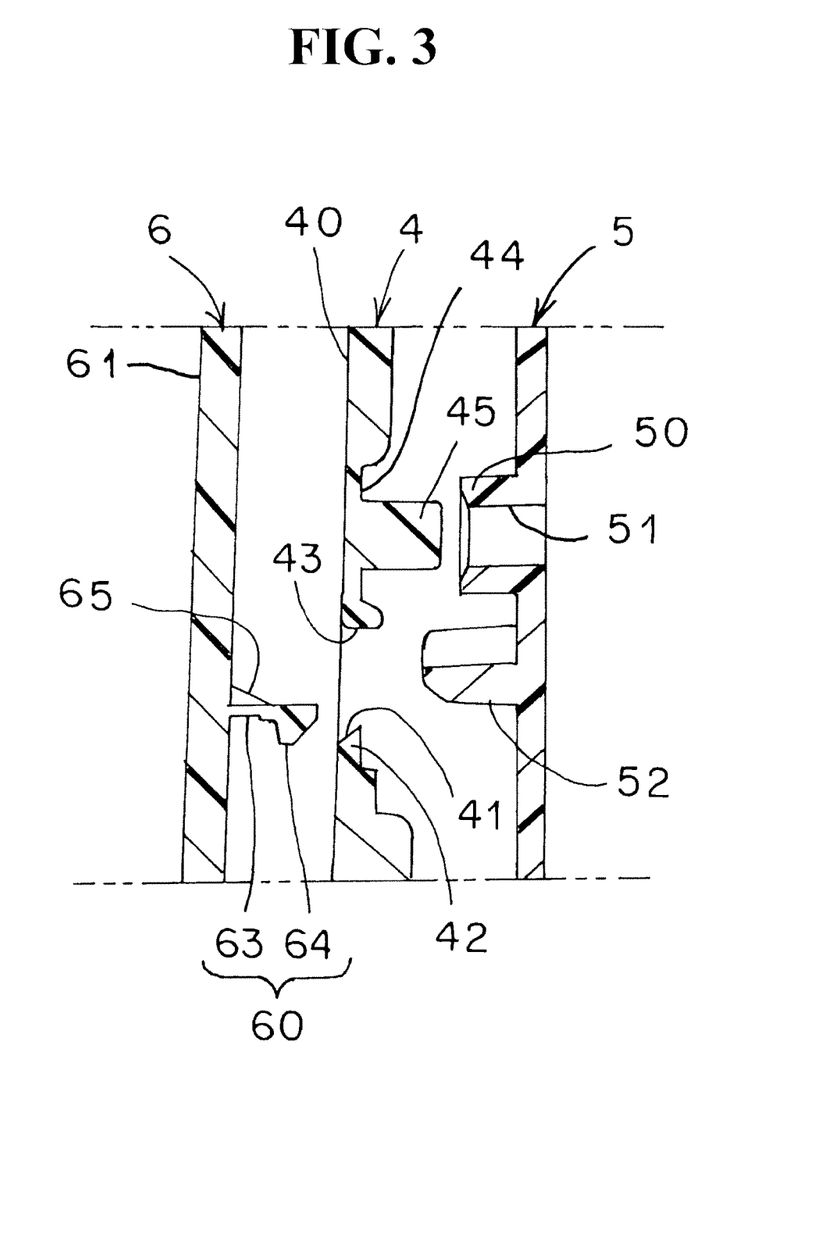
FIG. 3 is a sectional view (a partially sectional view) taken along the line in FIG. 2, showing a dissembled state of the base assembly.
Figure 4:
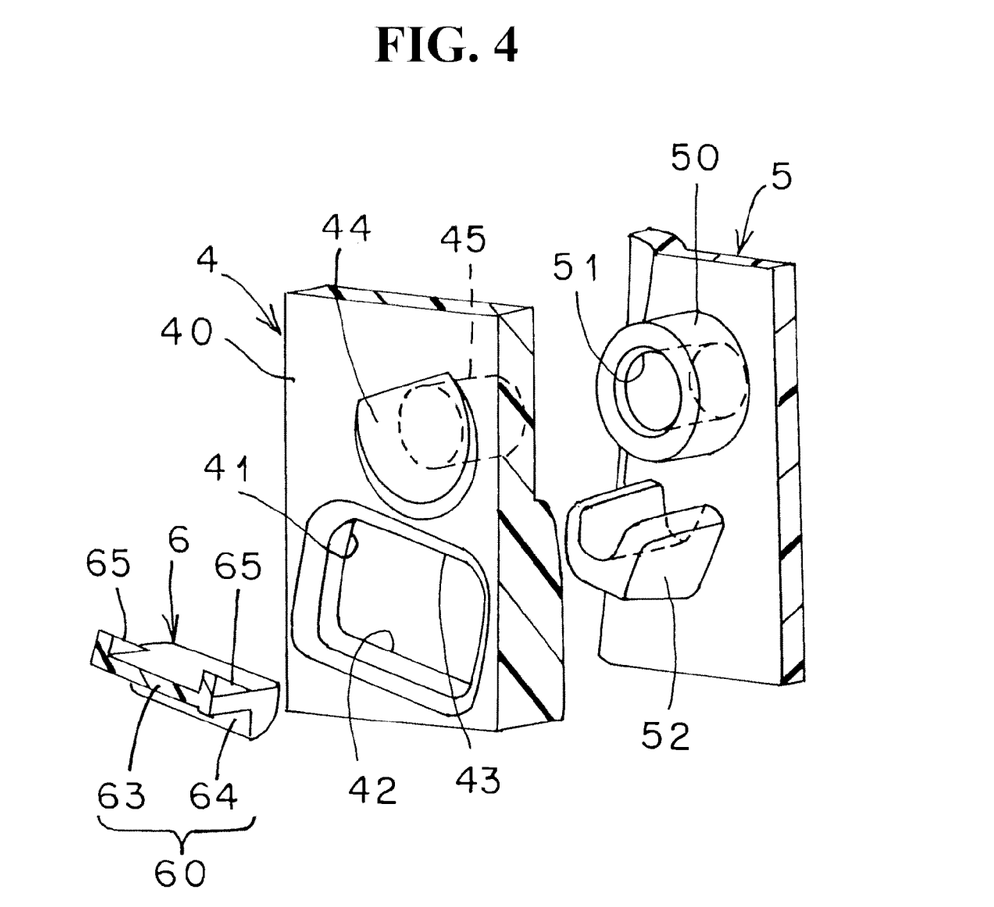
FIG. 4 is a partial perspective view showing a dissembled state of the base assembly in a state in which a part of the cover is not shown.
Figure 5:
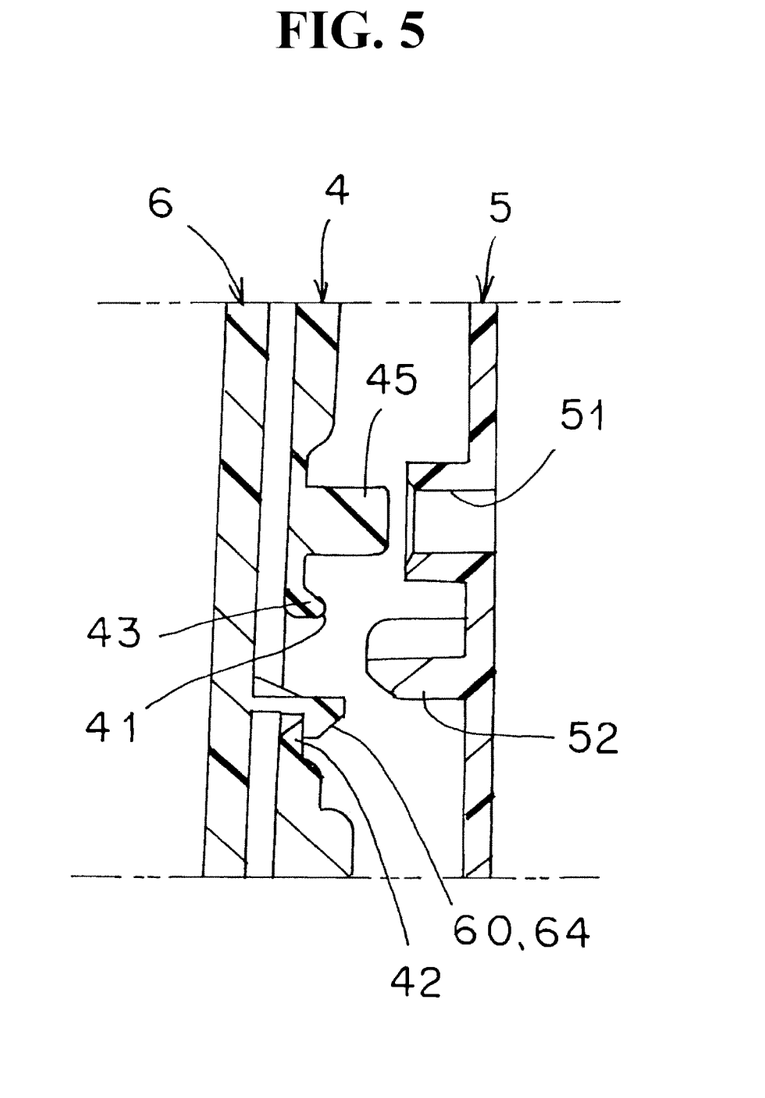
FIG. 5 is a sectional view (a partially sectional view) taken along the line III-III in FIG. 2, showing a base assembly in a state in which the cover is assembled with a base.
Figure 6:
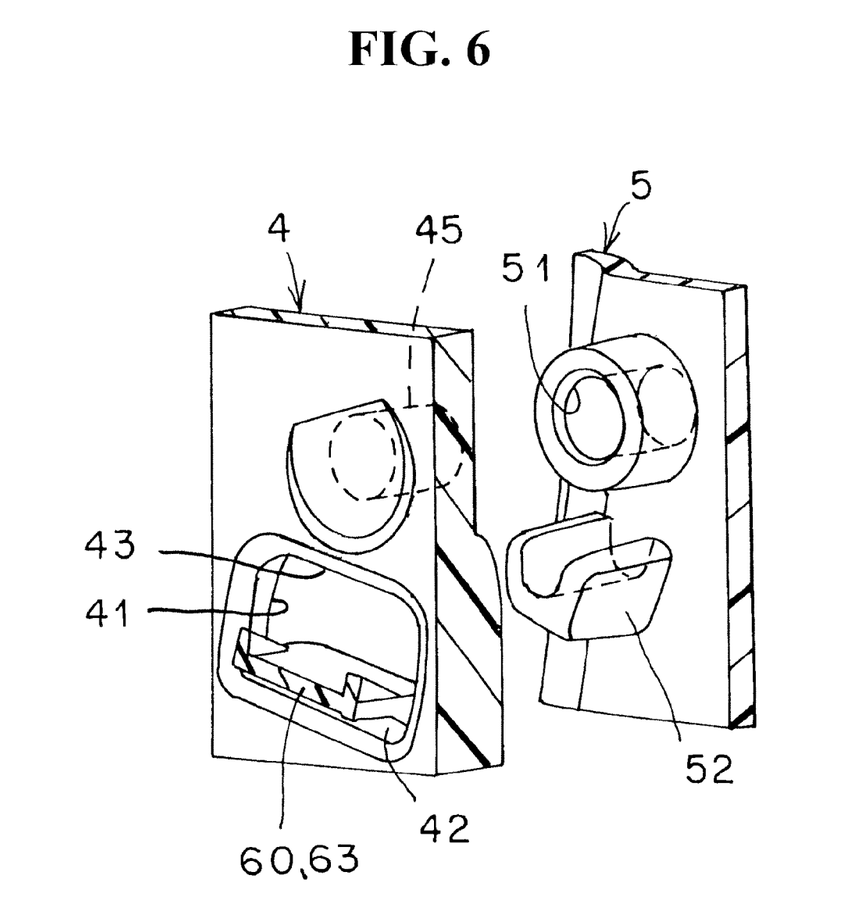
FIG. 6 is a partial perspective view showing the base assembly in a state in which the cover is assembled with the base.

In FIG. 1, reference numeral 1 designates a vehicular outside mirror device in the embodiment, and in this example, this reference numeral designates a door mirror device (a manually driven storage type door mirror device, a manually driven storage type door mirror, an electrically driven storage type door mirror device, or an electrically driven storage type door mirror). The door mirror device 1 is equipped at a respective one of the left and right doors of a motor vehicle. It is to be noted that the door mirror device 1 of the embodiment is equipped at a door on a left side of a motor vehicle. The door mirror device that is equipped at a door on a right side of the motor vehicle is substantially reversed in a transverse direction from the door mirror device 1 of the embodiment.

(Door Mirror Device)

The door mirror device 1, as shown in FIG. 1, is provided with a base assembly 2 and a mirror assembly 3. The base assembly 2 is fixed to a vehicle body panel (not shown) of a door of a motor vehicle in this example. The mirror assembly 3 is equipped in the case assembly 2.

(Base Assembly)

The base assembly 2, as shown in FIG. 2 to FIG. 8, is made of a base 4, a gasket 5, and a cover 6. In the base 4, the mirror assembly 3 is equipped. The gasket 5 is interposed (equipped to be interposed) between the base 4 and the vehicle body panel. The cover 6 is configured to cover the base 4 and the gasket 5 therewith.

(Base)

The base 4 is made of a fixing portion 40 and an equipping portion (not shown). The fixing portion 40 is formed in a plate shape. The fixing portion 40 is fixed to the vehicle body panel via the gasket 5 via a stud bolt (not shown) or the like. The equipping portion is formed in a stay shape that is provided so as to protrude from a face which is opposite to the gasket 5 of the fixing portion 40. In the equipping portion, the mirror assembly 3 is equipped. In other words, in the equipping portion, the mirror assembly 3 is equipped so as to be able to electrically driven via a shaft (not shown) and an electrically driven storage unit (not shown), or alternatively, is equipped so as to be able to be manually driven via a shaft and a clutch mechanism (not shown), or alternatively, is directly equipped in an appropriate manner.

At one site or at a plurality of sites of the base 4, insertion hole(s) 41 is/(are) provided. The insertion hole 41 is formed in a substantially rectangular shape. At a part of an edge part of the insertion hole 41, an engagement portion 42 is provided. The engagement portion 42 is formed in a sectional lance shape. In so far as the edge part of the insertion hole 41 is concerned, at an edge part which is opposite to the engagement portion 42, a pinch portion (a pinching portion) 43 is provided. In proximity to the pinch portion 43 of the base 4, a small thickness portion 44 is provided. On a face which is opposed to the gasket 5 of the small thickness portion 44, an engagement pin 45 is provided.

(Gasket)

The gasket 5 is formed in a plate shape which is substantially equal in size to the fixing portion 40 of the base 4. At one site or at a plurality of sites of a face which is opposed to the fixing portion 40 of the gasket 5, a boss portion 50 is provided in correspondence with the engagement pin 45 of the base 4. At the boss portion 50, an engagement hole 51 with which the engagement pin 45 engages is provided.

In proximity to the boss portion 50 of the face that is opposed to the fixing portion 40 of the gasket 5, a pressing portion 52 is provided in correspondence with the insertion hole 41 of the base 4. The pressing portion 52 is formed in a recessed shape (in a substantial U-shape) which is somewhat smaller in size than the insertion hole 41. A face at one end part (a bottom part) of the pressing portion 52 is formed in a flat shape or in a substantially flat shape which is opposed to the engagement portion 42 of the base 4. A face at the other end part of the pressing portion 52 (at a tip end part of an erected wall portion on each side) is formed in a flat shape or in a substantially flat shape which is opposed to the pinch portion 43 of the base 4.

(Cover)

The cover 6 is made of a first covering portion 61 and a second covering portion 62. The first covering portion is configured to cover the fixing portion 40 of the base 4 and the gasket 5 therewith. The second covering portion 62 is configured to cover the equipping portion of the base 4 therewith.

At one site or at a plurality of sites of a face which is opposed to the fixing portion 40 of the first covering portion 61, an elastic engagement claw portion 60 is provided in correspondence with the insertion hole 41 and the engagement portion 42 of the base 4. The elastic engagement claw portion 60 is made of an elastic portion 63 and an engagement claw portion 64. The elastic portion 63 is formed in a plate shape. The engagement claw portion 64 is formed in a lance shape, and is provided so as to be opposed to the engagement portion 42 on one face (a lower face) at a tip end part of the elastic portion 63. On each side of a proximal end part of the elastic portion 63, a reinforcement rib 65 formed in a triangular shape is provided.

(Assembling Base Assembly)

Figure 7:
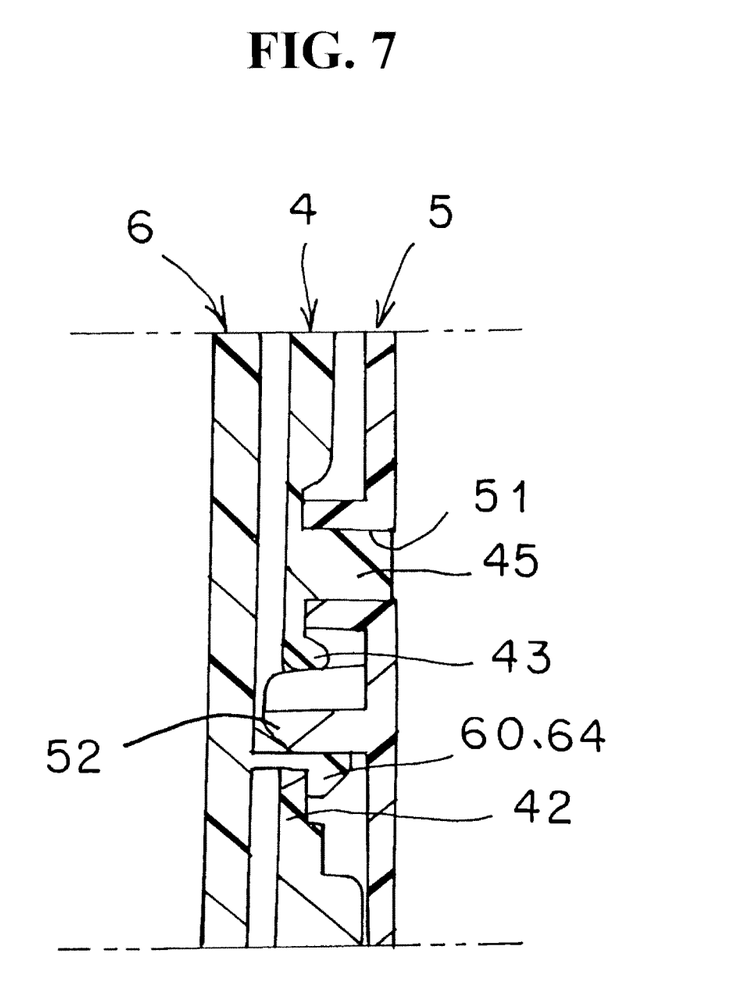
FIG. 7 is a sectional view (a partially sectional view) taken along the line III-III in FIG. 2, showing the base assembly.
Figure 8:
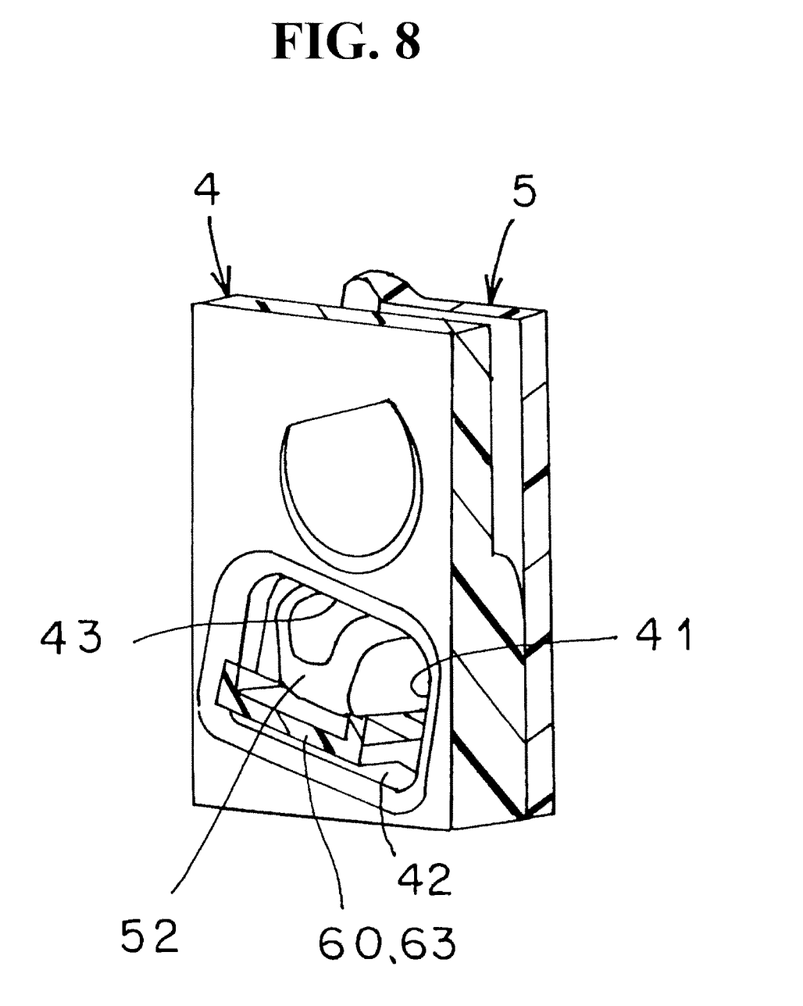
FIG. 8 is a partially perspective view showing the base assembly in a state in which a part of the cover is not shown.

First, as shown in FIG. 3 to FIG. 6, the elastic engagement claw portion 60 of the cover 6 is inserted into the insertion hole 41. The engagement claw portion 64 of the elastic engagement claw portion 60 is elastically engaged with the engagement portion 42 of the base 4. In this state, next, as shown in FIG. 7 and FIG. 8, the engagement pin 45 of the base 4 is elastically engaged into the engagement hole 51 of the gasket 5. On the other hand, the pressing portion 52 of the gasket 5 is inserted into the insertion hole 41 of the base 4. The pressing portion 52 is inserted between the pinch portion 43 of the base 4 and the elastic engagement claw portion 60 of the cover 6. The pressing portion 52 presses the elastic engagement claw portion 60 against the engagement portion 42. In this manner, the base 4, the gasket 5, and the cover 6 are integrally assembled with each other.

(Mirror Assembly)

The mirror assembly 3, as shown in FIG. 1, is made of a mirror housing 30, a lamp unit 31, a power unit (not shown), and a mirror or a mirror unit (not shown). The mirror housing 30 is equipped in the equipping portion of the base assembly 2. To the lamp unit 30, the lamp unit 31 is mounted. To the mirror housing 30, the power unit is also mounted. To the power unit, the mirror is mounted so as to be able to be inclined vertically and transversely.

Advantageous Effects of the Embodiment

The door mirror device 1 in the embodiment is made of the constituent elements as described above, and hereinafter, its related advantageous effects will be described.

The door mirror device 1 in the embodiment is capable of integrally assembling the base 4, the gasket 5, and the cover 6 with each other without a need to use a screw. In this manner, the number of parts or the number of assembling steps can be reduced, and accordingly, its related manufacturing costs can be reduced.

In so far as the door mirror device 1 in the present invention is concerned, the pressing portion 52 is pressed against the gasket 5. In this manner, the pressing portion 52 presses the elastic engagement claw portion 60 of the cover 6 against the engagement portion 42 of the base 4. As a result, there may be a case in which the elasticity of the elastic portion 63 of the elastic engagement claw portion 60 of the cover 6 is degraded due to a change with the elapse of time in the parts (in particular, the cover 6) exerted by a thermal effect or the like. In this case as well, in a state of elastic engagement between the engagement claw portion 64 of the elastic engagement claw portion 60 of the cover 6 and the engagement portion 42 of the base 4, an occurrence of a backlash or lifting can be prevented. Therefore, the state of the elastic engagement between the engagement claw portion 64 and the engagement portion 42 can be maintained over a long period of time.

In so far as the door mirror device 1 in the embodiment is concerned, the pinch portion 43 is provided at an edge part which is opposite to the engagement portion 42, of the edge part of the insertion hole 41 of the base 4. In this manner, the pressing portion 52 of the gasket 5 is pinched between the pinch portion 43 and the elastic engagement claw portion 60 of the cover 6. As a result, a force of the pressing portion 52 to press the elastic engagement claw portion 60 against the engagement portion 42 can be sufficiently ensured. Therefore, the engagement claw portion 64 and the engagement portion 42 can be reliably elastically engaged with each other.

In so far as the door mirror device 1 in the embodiment is concerned, the engagement portion 42 and/or the pinch portion 43 of the base 4 and the elastic engagement claw portion 60 of the cover 6 and the pressing portion 52 of the gasket 5; and the engagement pin 45 of the base 4 and the engagement hole 51 of the gasket 5, are provided in proximity to each other. In this manner, a site of pinching between a respective one of the pinch portion 43 and the elastic engagement claw portion 60 and the pressing portion 52 and a site of engagement between the engagement pin 45 and the engagement hole 51 are located at their appropriate positions which are proximal to each other. As a result, by way of the engagement between the engagement pin 45 and the engagement hole 51, a force of pinching between a respective one of the pinch portion 43 and the elastic engagement claw portion 60 and the pressing portion 52 can be sufficiently ensured. Therefore, the state of the elastic engagement between the engagement claw portion 64 and the engagement portion 42 can be reliably maintained over a further long period of time.

In addition, in so far as the door mirror device 1 in the embodiment is concerned, the engagement portion 42 and/or the pinch portion 43 and the elastic engagement claw portion 60 and the pressing portion 52; and the engagement pin 45 and the engagement hole 51, are provided in proximity to each other. In this manner, the processing step of pinching between: the respective one of the pinch portion 43 and the elastic engagement claw portion 60; and the pressing portion 52, and the processing step of engagement between the engagement pin 45 and the engagement hole 51 can be carried out at the same time. As a result, its related assembling work can be efficiently carried out.

In so far as the door mirror device 1 in the embodiment is concerned, a small thickness portion 44 is provided in a site which is proximal to the pinch portion 43 of the base 4 and in which the engagement pin 45 is provided. In this manner, the pinching between: the respective one of the pinch portion 43 and the elastic engagement claw portion 60; and the pressing portion 52, and the engagement between the engagement pin 45 and the engagement hole 51 can be easily carried out. As a result, its related assembling work can be efficiently carried out.

In so far as the door mirror device 1 in the embodiment is concerned, the engagement pin 45 is provided in the base 4, and the engagement hole 51 is provided in the gasket 5. In this manner, as long as the engagement pin 45 is engaged with the engagement hole 51, a relative position between the base 4 and the gasket 5 is determined. As a result, the pressing portion 52 of the gasket 5 can be easily and reliably pinched between the pinch portion 43 of the base 4 and the elastic engagement claw portion 60 of the cover 6. In addition, a positioning portion is provided between the gasket 5 and the vehicle body panel, whereby, when the base 4 is fixed to the vehicle body panel with a stud bolt via the gasket 5, the base 4 and the vehicle body panel can be positioned each other via the gasket 5 in an appropriate manner. Therefore, the base 4 can be easily and reliably fixed to the vehicle body panel via the gasket 5.

Example Other Than the Embodiment

It is to be noted that in the foregoing embodiment, the engagement portion 42 is provided in the base 4, and the elastic engagement claw portion 60 is provided in the cover 6. However, in the present invention, an engagement portion may be provided in a cover while an elastic engagement claw portion is provided in a base, or alternatively, an elastic engagement claw portion and an engagement portion are respectively provided in a cover while an engagement portion and an elastic engagement claw portion are respectively provided in a base.

In addition, in the foregoing embodiment, the engagement pin 45 is provided in the base 4, and the engagement hole 51 is provided in the gasket 5. However, in the present invention, an engagement pin may be provided in a gasket while an engagement hole is provided in a base, or alternatively, an engagement pin and an engagement hole are respectively provided in a gasket while an engagement hole and an engagement pin are respectively provided in a base.

What is claimed is:

1. A vehicular outside mirror device comprising:
a base assembly; and
a mirror assembly which is equipped in the base assembly;
wherein the base assembly is comprised of:
a base in which the mirror assembly is equipped;
a gasket which is disposed on a first side of the base; and
a cover, disposed on a second side of the base opposite to the first side, configured to cover the base and the gasket therewith;
an engagement portion and an elastic engagement claw portion configured to elastically engage therewith are provided in the base and the cover,
wherein an engagement pin and an engagement hole with which the engagement pin engages are provided in the base and the gasket, and
a pressing portion configured to press the elastic engagement claw portion against the engagement portion is provided in the gasket.

2. The vehicular outside mirror device according to claim 1,
wherein an insertion hole is provided in the base,
the engagement portion is provided at a part of an edge part of the insertion hole, and
a pinch portion configured to pinch the pressing portion together with the elastic engagement claw portion is provided at an edge part which is opposite to the engagement portion in the edge part of the insertion hole.

3. The vehicular outside mirror device according to claim 2,
wherein the engagement portion and the pinch portion and the elastic engagement claw portion and the pressing portion; and the engagement pin and the engagement hole, are provided in proximity to each other.

4. The vehicular outside mirror device according to claim 1,
wherein elastic engagement claw portion comprises an elastic portion and an engagement claw disposed on a tip of the elastic portion, the engagement claw configured to elasticly engage the engagement portion.

* * * * *